United States Patent Office 3,340,302
Patented Sept. 5, 1967

3,340,302
PROCESS FOR MANUFACTURE OF p-NITROSO-
N-PHENYLANILINES
Herbert L. Young, Wilmington, Del., assignor to Hercules
Incorporated, a corporation of Delaware
No Drawing. Filed Apr. 1, 1964, Ser. No. 356,659
16 Claims. (Cl. 260—576)

This invention relates to a method for directly reacting aniline, and certain other aromatic primary amines, with p-nitrosophenol to form a corresponding p-nitroso-N-phenylaniline.

p-Nitroso-N-phenylanilines have especial utility as chemical intermediates particularly in respect of the ease in which the nitroso group can be reduced to provide corresponding amine derivatives. For example, p-nitrosodiphenylamine, which is easily reductively alkylated is an important intermediate in the manufacture of N-isopropyl-N'-phenyl-p-phenylenediamine, a well known antiozonant.

A method for the manufacture of p-nitrosophenylamines by the indirect amination of p-nitrosophenol is disclosed and claimed in the copending U.S. application of Hays and Young, Ser. No. 17,894, filed Mar. 28, 1960, now U.S. 3,107,264, in accordance with which p-nitrosophenol is first reacted with a primary or secondary alcohol to form the corresponding p-nitrosophenyl ether and the ether is then reacted with a primary amine to form the p-nitrosophenylamine product. The use of the ether in the process of the above said copending application is based upon the discovery that when endeavoring to directly react a primary amine with p-nitrosophenol to form the p-nitrosophenyl-N-substituted amine, an unduly low conversion of the p-nitrosophenol to p-nitroso-N-substituted amine is obtained.

This invention is concerned with a method by which certain primary aromatic amines can be reacted directly with p-nitrosophenol in accordance with critical process conditions to form a corresponding p-nitroso-N-phenylaniline as amination product at conversion levels in the order of 60–70 percent and higher but with yield loss often not exceeding 5 to 10 percent.

In accordance with the invention, a process is provided for directly reacting p-nitrosophenol with a primary amine to produce a p-nitroso-N-phenylaniline which comprises admixing a primary aromatic amine selected from the group consisting of aniline, o-toluidine, m-toluidine, p-toluidine, p-anisidine, p-phenetidine and p-chloroaniline, with p-nitrosophenol in a mole ratio thereto in excess of 1:1 for reaction to produce the said p-nitroso-N-phenylaniline, together with a tertiary aromatic amine selected from the group consisting of pyridine, quinoline, isoquinoline and 4-picoline in a liquid volume ratio to that proportion of said primary aromatic amine, in said molar excess, of at least 0.2:1, and an acid selected from the group consisting of hydrogen chloride, p-toluene sulfonic acid, and boron trifluoride, as a catalyst for the said reaction; maintaining the resulting admixture at a temperature of from 0 to 100° C. for a period of at least 2 minutes, whereby said reaction takes place; and recovering a p-nitroso-N-phenylaniline from the resulting reaction mixture as product of the process.

The primary aromatic amine reactant added to the system in molar excess of p-nitrosophenol added thereto functions as a solvent for the amination so that both the excess primary amine reactant and the tertiary amine, the latter being referred to hereinafter as a cosolvent, function as the solvent for the amination reaction.

The unique effect of pyridine, quinoline, isoquinoline and 4-picoline, each as a cosolvent, in the amination process of the invention, is illustrated by way of a series of amination runs, each involving reaction of aniline with p-nitrosophenol to form p-nitrosodiphenylamine, at 35° C., in the presence of hydrogen chloride as a catalyst and added as aniline hydrochloride. In each run, the amination reaction mixture contained 10 mmoles p-nitrosophenol, 10 mmoles aniline hydrochloride and 10 ml. of aniline-cosolvent. Data summarizing these runs are set forth in Table I.

TABLE I

| Solvent | Aniline, Total mmoles ᵃ | Tertiary Amine Co-solvent, mmoles | Reaction Time, hrs. | Percent Conversion to Form p-Nitroso-diphenyl-amine |
|---|---|---|---|---|
| Aniline | 120 | None | 0.5 | 30 |
| | | | 1.0 | 32 |
| | | | 2.0 | 34 |
| Aniline—Pyridine | 98 | 25 | 2.0 | 58 |
| Do | 65 | 62 | 2.0 | 62–65 |
| | | | 3.0 | 60–61 |
| Do | 32 | 99 | 2.0 | 57 |
| | | | 3.0 | 58 |
| Pyridine | 10 | 124 | 2.0 | 31 |
| | | | 3.0 | 34 |
| Aniline—Quinoline | 65 | 42 | 2.0 | 61 |
| Aniline—Isoquinoline | 65 | 42 | 2.0 | 65 |
| Aniline—4-picoline | 65 | 51 | 3.0 | 61 |

ᵃ Includes the 10 mmoles of aniline introduced as aniline hydrochloride.

In Table II are set forth data illustrative of unsuitably low conversions that are obtained in the presence of a tertiary amine in lieu of a tertiary amine cosolvent of the invention.

TABLE II

| Solvent | Aniline, Total mmoles ᵃ | Tertiary Amine Co-solvent, mmoles | Reaction Time, hrs. | Percent Conversion to Form p-Nitroso-diphenyl-amine |
|---|---|---|---|---|
| Aniline—2-picoline | 65 | 51 | 2.0 | 41 |
| Aniline—2,6-lutidine | 65 | 43 | 2.0 | 8 |
| Aniline—Dimethylaniline | 65 | 39 | 2.0 | 29–36 |
| Do | 32 | 63 | 2.0 | 13 |
| Do | 10 | 79 | 2.0 | 4 |
| Aniline—Triethylamine | 65 | 36 | 2.0 | <1 |
| Do | 32 | 58 | 2.0 | <1 |
| Aniline—Triethanolamine | 65 | 38 | 2.0 | 9 |

ᵃ Includes the 10 mmoles of aniline introduced as aniline hydrochloride.

The data of Tables I and II demonstrate conversions of p-nitrosophenol to p-nitrosodiphenylamine in the region of 60–70 percent when utilizing, as a solvent for the amination, a combination of excess primary amine reactant with one of the above said cosolvents, in accordance with the invention; whereas with aniline alone, or with the cosolvent alone, or with aniline as a solvent in conjunction with a tertiary amine "cosolvent" outside the scope of the invention, conversions are significantly lower, varying substantially nil to not more than about 35 percent. Of especial note is the low conversion obtained when utilizing aniline as a solvent in conjunction with 2-picoline or with 2,6-lutidine each as a "cosolvent," the structure of these compounds being, nevertheless, very closely related to that of pyridine, a cosolvent in accordance with the invention.

The tertiary aromatic amine cosolvent is utilized in a liquid volume ratio to the primary aromatic amine solvent, i.e., that proportion of the primary aromatic amine reactant added in stoichiometric excess of the p-nitrosophenol, of at least 0.2:1, generally within the range of from 0.20:1 to 10:1 and higher, if desired. Equivolume proportions of cosolvent and excess primary aromatic amine (solvent) are generally most advantageously utilized.

The criticality of choice of acid catalyst in carrying out the process of the invention is demonstrated with reference to several different aminations, each carried out in the presence of a different acid catalyst. Each run was made utilizing aniline as the primary aromatic amine reactant and solvent at 35° C. Data summarizing these runs are set forth in Table III.

TABLE III

| Catalyst | Mmoles | p-Nitroso-phenol, mmoles | Aniline, mmoles | Pyridine, mmoles | Reaction Time, Hrs. | Percent Conversion |
|---|---|---|---|---|---|---|
| Aniline hydrochloride | 10 | 10 | 55 | 62 | 2.0 | 62–65 |
| | | | | | 3.0 | 60–61 |
| | 10 | 10 | 110 | | 0.5 | 30 |
| | | | | | 1.0 | 32 |
| | | | | | 2.0 | 34 |
| p-Toluene sulfonic acid | 10 | 10 | 66 | 62 | 2.0 | 62 |
| | | | | | 3.0 | 65 |
| | | | | | 4.0 | 61 |
| | 10 | 10 | 121 | | 2.0 | ¹48 |
| | 10 | 10 | 121 | | 3.0 | ¹37 |
| Boron trifluoride | 10 | 10 | 66 | 56 | 2.0 | 60 |
| | | | | | 3.0 | ¹70 |
| | | | | | 4.0 | 67 |
| | 10 | 10 | 121 | | 1.0 | ¹46 |
| | 10 | 10 | 121 | | 2.0 | ¹45 |
| Phosphoric acid | 10 | 10 | 120 | | 2.0 | 6 |
| | 10 | 10 | 66 | 62 | 2.0 | 2 |

¹ Contains about 4–7 percent p-phenylazodiphenylamine.

The data of Table III demonstrate the high conversions accomplished when utilizing hydrogen chloride, p-toluene sulfonic acid and boron trifluoride as acid catalysts in the practice of the invention; and the specificity of these acids with reference to the low conversion (substantially nil) obtained utilizing phosphoric acid as catalyst, in the absence, and in the presence, of pyridine as cosolvent.

In Table IV are shown a series of runs demonstrating conversions in the order of 60–70 percent obtained in the practice of the invention utilizing primary aromatic amine reactant-solvents other than aniline. Also in Table IV are shown the results of similar runs utilizing reactant-solvents outside the scope of the invention, with no conversion to the p-nitroso-N-phenylaniline, thus further demonstrating the specificity of those primary-reactant solvents of the invention. In the runs summarized in Table IV, a primary aromatic amine reactant of the invention, added in stoichiometric excess, was reacted with p-nitrosophenol at 35° C. (except Run 7, 45° C.) in the presence (Runs 1–3, 5–6, 8–9, 11) and in the absence (Runs 4, 7, 10) of pyridine as a tertiary amine cosolvent under the processing conditions shown. Results of similar runs (Runs 12, 13, 14) involving o–, m– and p-nitroaniline "reactant solvents" are included for comparison.

TABLE IV

| Run No. | Primary Aromatic Amine | Mmoles | p-Nitrosophenol, mmoles | Acid Catalyst (10 mmoles) | Pyridine (mmoles) | Reaction Time, hrs. | p-Nitroso-N-phenylaniline Product | Conversion,[1] Percent |
|---|---|---|---|---|---|---|---|---|
| 1 | o-Toluidine | 65 | 10 | p-Toluene sulfonic acid | 62 | 3.0 | o-Methyl-p'-nitrosodiphenylamine | 56 |
| 2 | m-Toluidine | 65 | 10 | ___do___ | 62 | 3.0 | M-methyl-p'-nitrosodiphenylamine | 60 |
| 3 | ___do___ | 55 | 10 | m-Toluidine hydrochloride | 62 | 3.0 | ___do___ | 61 |
| 4 | ___do___ | 118 | 10 | p-Tlouene sulfonic acid | | 3.0 | ___do___ | 50 |
| 5 | p-Toluidine | 65 | 10 | ___do___ | 62 | 3.0 | p-Methyl-p'-nitrosodiphenyl amine | 63 |
| 6 | ___do___ | 56 | 10 | p-Toluidine hydrochloride | 62 | 3.0 | ___do___ | 63 |
| 7 | ___do___ | 121 | 10 | p-Toluene sulfonic acid | | [2] 2.0 | ___do___ | 44 |
| 8 | p-Anisidine | 73 | 10 | ___do___ | 62 | 3.0 | p-Methoxy-p'-nitrosodiphenylamine | 68 |
| 9 | p-Phenetidine | 65 | 10 | ___do___ | 62 | 3.0 | p-Ethoxy-p'-nitrosodiphenylamine | 66 |
| 10 | ___do___ | 123 | 10 | ___do___ | | 3.0 | ___do___ | 35 |
| 11 | p-Chloroaniline | 65 | 10 | ___do___ | 62 | 3.0 | p-Chloro-p'-nitrosodiphenyl amine | 63 |
| 12 | o-Nitroaniline | 65 | 10 | ___do___ | 62 | 3.0 | | None |
| 13 | m-Nitroaniline | 65 | 10 | ___do___ | 62 | 3.0 | | None |
| 14 | p-Nitroaniline | 65 | 10 | ___do___ | 62 | 3.0 | | None |

[1] Includes corresponding substituted p-phenylazodiphenylamine (about 4-7 percent). [2] Amination at 45° C.

Although the primary amine can be added to the reaction system in any suitable mole ratio to the p-nitrosophenol added thereto, in excess of 1:1, the said mole ratio is generally within the range of from about 1.5:1 to 15:1, more often about 3:1 to 12:1 and preferably from about 4.5:1 to 7.5:1.

The concentration of catalyst in the amination system is not critical except that a minimum, i.e., at least a catalytic, amount is required in order to accomplish a reasonable reaction rate. A mole ratio of acid to p-nitrosophenol greater than 2.5:1 is generally not required. In a lower range of acid:p-nitrosophenol mole ratio, e.g., 0.25:1 to 1:1, the conversion during a given reaction period is lower than that obtained at a higher level, e.g., from 1:1 to 2:1, and an increase in the ratio within the 0.5:1 to 1:1 range results in somewhat of an increase in conversion. However, although there is some increase in conversion during the given reaction period at a higher acid:p-nitrosophenol mole ratio, e.g., 1:1, there is very little increase in conversion that takes place when increasing the said ratio above that level, e.g., within from 1:1 to 2:1. Thus, in the practice of the invention, the acid catalyst:p-nitrosophenol mole ratio is generally most advantageously in the range of from about 0.8:1 to 1.2:1 although the optimum value is somewhat dependent upon the reactants and the reaction conditions employed.

The effect of reaction time in the amination process of the invention is somewhat similar to that observed when catalyst concentration is increased. Thus, longer reaction periods increase the consumption of the p-nitrosophenol without an appreciable increase in conversion to the desired p-nitrosodiphenylamine. However, the reaction time more generally utilized is within the range of from about 0.5 to 4 hours, and values outside this range are sometimes beneficial, dependent upon the reactants and process conditions. Reaction times as short as about 2 minutes are advantageously utilized at the higher reaction temperature levels, and are sometimes justified at lower temperature levels with accompanying low conversion in consideration of the proportionately smaller extent of by-product formation that takes place. Reaction times longer than 5 hours are seldom, if ever, of any significant advantage.

Reaction temperature is in the order of about 0–100° C. and generally is from 25–55° C., and it preferably does not exceed about 40° C. The effect of reaction temperature appears to be similar to that of catalyst concentration and reaction time, the consumption of the p-nitrosophenol being higher at the higher temperature but without significant increase in conversion to the desired p-nitrosodiphenylamine product. Accordingly, in many instances, the temperature utilized will be in the order of 15–35° C. inasmuch as under these conditions, although somewhat lower reaction rates are obtained, ultimate product yield is greater due to a lesser degree of side reaction that takes place under these conditions.

Although the liquid volume ratio of tertiary amine co-solvent to primary aromatic amine (in stoichiometric excess) is generally not above about 5:1, in the practice of the invention, higher ratios can be employed, when desired, such as up to 10:1 or higher.

Although maximum conversion is generally in the order of 60 to 70 percent, a low net yield loss is accomplished in the practice of the invention. Further, substantially the only side reactions that take place are those involving the formation of by-product by reaction of the primary aromatic reactant with (1) the nitroso group of the p-nitrosophenol reactant and (2) with the p-nitroso-N-phenylaniline product to form, respectively, a corresponding p-phenylazophenol and a p-phenylazodiphenylamine. Each of these by-products can be hydrogenated with split-off of the primary amine reactant for recycle. When the primary amine reactant is aniline, i.e., $$C_6H_5NH_2$$

hydrogenation of the p-phenylazodiphenylamine also results in formation of p-aminodiphenylamine, which is a precursor of N-isopropyl-N'-phenyl-p-phenylene diamine, a well known antiozonant. p-Nitrosodiphenylamine product of reaction of aniline and p-nitrosophenol, in the practice of the process of this invention, is also a precursor of the said antiozonant, and consequently, the p-aminodiphenylamine by-product, i.e., resulting from hydrogenation of p-phenylazodiphenylamine, can constitute a "product credit" to provide for a reduced net yield loss.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:
1. A process for directly reacting p-nitrosophenol with a primary amine to produce a p-nitroso-N-phenylaniline which comprises admixing a primary aromatic amine selected from the group consisting of aniline, o-toluidine, m-toluidine, p-toluidine, p-anisidine, p-phenetidine and p-chloroaniline, with p-nitrosophenol in a mole ratio thereto in excess of 1:1 for reaction to produce the said p-nitroso-N-phenylaniline, together with a tertiary aromatic amine selected from the group consisting of pyridine, quinoline, isoquinoline, and 4-picoline in a liquid volume ratio to that proportion of said primary aromatic amine, in said molar excess, of at least 0.2:1, and an acid selected from the group consisting of hydrogen chloride, p-toluene sulfonic acid, and boron trifluoride, as a catalyst for the said reaction; maintaining the resulting ad- mixture at a temperature of from 0 to 100° C. for a period of at least 2 minutes, whereby said reaction takes place; and recovering a p-nitroso-N-phenylaniline from the resulting reaction mixture as product of the process.

2. A process of claim 1 wherein said primary aromatic amine is admixed with said p-nitrosophenol in a mole ratio thereto of from 1.5:1 to 15:1, said tertiary amine is admixed with said excess of primary aromatic amine in a liquid volume ratio thereto not exceeding 10:1, and said resulting admixture is maintained at said temperature for a period not exceeding 5 hours.

3. A process of claim 2 wherein aniline as said primary amine is admixed in a mole ratio to said p-nitrosophenol of from 4.5:1 to 7.5:1, said tertiary amine is pyridine and said liquid volume ratio does not exceed about 5:1, said acid catalyst is admixed in a mole ratio to said p-nitrosophenol of from about 0.8:1 to 1.2:1, and said resulting admixture is maintained at a temperature of from 15 to 35° C. for a period of from 0.5 to 4 hours.

4. A process of claim 2 wherein aniline as said primary aromatic amine is admixed in a mole ratio to p-nitrosophenol of from 3:1 to 12:1, said tertiary amine is pyridine and said liquid volume ratio does not exceed about 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

5. A process of claim 2 wherein aniline as said primary aromatic amine is admixed in a mole ratio to said p-nitrosophenol of from 3:1 to 12:1, said tertiary amine is 4-picoline and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

6. A process of claim 2 wherein o-toluidene as said primary aromatic amine is admixed in a mole ratio to said p-nitrosophenol of from 3:1 to 12:1, said tertiary amine is pyridine and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

7. A process of claim 2 wherein m-toluidine as said primary aromatic amine is admixed in a mole ratio to said p-nitrosophenol of from 3:1 to 12:1, said tertiary amine is pyridine, and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

8. A process of claim 2 wherein p-toluidine as said primary aromatic amine is admixed in a mole ratio to said p-nitrosophenol of from 3:1 to 12:1, said tertiary amine is pyridine and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

9. A process of claim 2 wherein p-anisidine as said primary aromatic amine is admixed in a mole ratio to said p-nitrosophenol of from 3:1 to 12:1, said tertiary amine is pyridine and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

10. A process of claim 2 wherein p-phenetidine as said primary aromatic amine is admixed in a mole ratio to said p-nitrosophenol of from 3:1 to 12:1, said tertiary amine is pyridine and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 50° C. for a period of from 0.5 to 4 hours.

11. A process of claim 2 wherein aniline as said primary aromatic amine is admixed in a mole ratio to said p-nitrosophenol of from 3:1 to 12:1, said tertiary amine is quinoline and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

12. A process of claim 2 wherein aniline as said primary aromatic amine is admixed in a mole ratio to said p-nitrosophenol of from 3:1 to 12:1, said tertiary amine is isoquinoline and said liquid volume ratio does not exceed 5:1; said acid catalyst is admixed in a mole ratio to said p-nitrosophenol of from 0.25:1 to 2.5:1; and said temperature of the resulting admixture is maintained within the range of from 25 to 55° C. for a period of from 0.5 to 4 hours.

13. A process of claim 1 wherein said temperature does not exceed 55° C.

14. A process of claim 2 wherein said primary aromatic amine is aniline.

15. A process of claim 2 wherein said liquid volume ratio does not exceed 5:1.

16. A process of claim 2 wherein said temperature is within the range of 25 to 55° C.

No references cited.

CHARLES B. PARKER, *Primary Examiner.*

NELSON A. WICZER, *Assistant Examiner.*